United States Patent [19]

Guimier et al.

[11] 3,932,714

[45] Jan. 13, 1976

[54] REMOTE ELECTRICAL TRANSMISSION SYSTEM

[75] Inventors: Jacques A. Guimier, Courtry; Pierre F. Coutin, Paris, both of France

[73] Assignee: R. Alkan & Cie, Paris, France

[22] Filed: Dec. 5, 1974

[21] Appl. No.: 530,032

[30] Foreign Application Priority Data

Dec. 13, 1974 France ............................ 74.44558

[52] U.S. Cl. .................... 191/12 R; 340/172; 191/1

[51] Int. Cl.² ........................................ H02G 11/02

[58] Field of Search ........... 191/12 R, 2, 1; 340/172

[56] References Cited

UNITED STATES PATENTS

| | | | |
|---|---|---|---|
| 3,264,417 | 8/1966 | Smith | 191/12 R |
| 3,588,828 | 6/1971 | Schulein | 340/172 |

*Primary Examiner*—M. Henson Wood, Jr.
*Assistant Examiner*—D. W. Keen
*Attorney, Agent, or Firm*—Ulle C. Linton

[57] ABSTRACT

This device for the remote transmission of a plurality of orders through a single control line or channel is intended more particularly for controlling the firing rates and volley-firing limitation of rockets or miscellaneous cartridges notably on aircraft. It comprises essentially a selector-switch control unit and a receiver unit. The device is energized from the common direct-current supply of the aircraft.

4 Claims, 3 Drawing Figures

REMOTE ELECTRICAL TRANSMISSION SYSTEM

BACKGROUND OF THE INVENTION

This invention relates to remote electrical transmission systems and has specific reference to a device for the remote transmission of multiple orders from a single d.c. voltage source, through a single channel, to the apparatus to be controlled, for example when using this basic principle in the remote control of the firing rate and volley firing limitation on aircrafts for firing rockets or miscellaneous catridges.

Considering this specific application of such systems to aircrafts equipped with rocket -or catridge-launchers, it is sometimes convenient and necessary for the pilot to be able to select, during the flight, the firing rate and the firing volley magnitude as a function of the specific task contemplated or the specific conditions with which he is confronted. The corresponding information must be transmitted through remote-control means to the firing members, said means being energized from the aircraft generating system through a minimum number of conductors.

SUMMARY OF THE INVENTION

With the device constituting the subject-matter of the present invention it is possible to achieve the above-defined operations by using a single connecting conductor per control, in addition to the general electric system.

The device according to the present invention comprises essentially a control unit incorporating a selector switch adapted to connect the transmission channel to anyone of a plurality of distributing circuits supplied with the single voltage but shunt-connected to respective Zener diodes having stepped reference voltages, and a receiver unit comprising transistors driven by circuit means supplied from said single channel through another set of Zener diodes, respectively, the reference voltage of these last-mentioned Zener diodes being stepped in alternation with respect to the voltages of the Zener diodes of said control unit, whereby said transistors will open or close different control circuit according to the position in which the control selector switch is set.

DESCRIPTION OF THE PREFERRED EMBODIMENT

Figure 1:
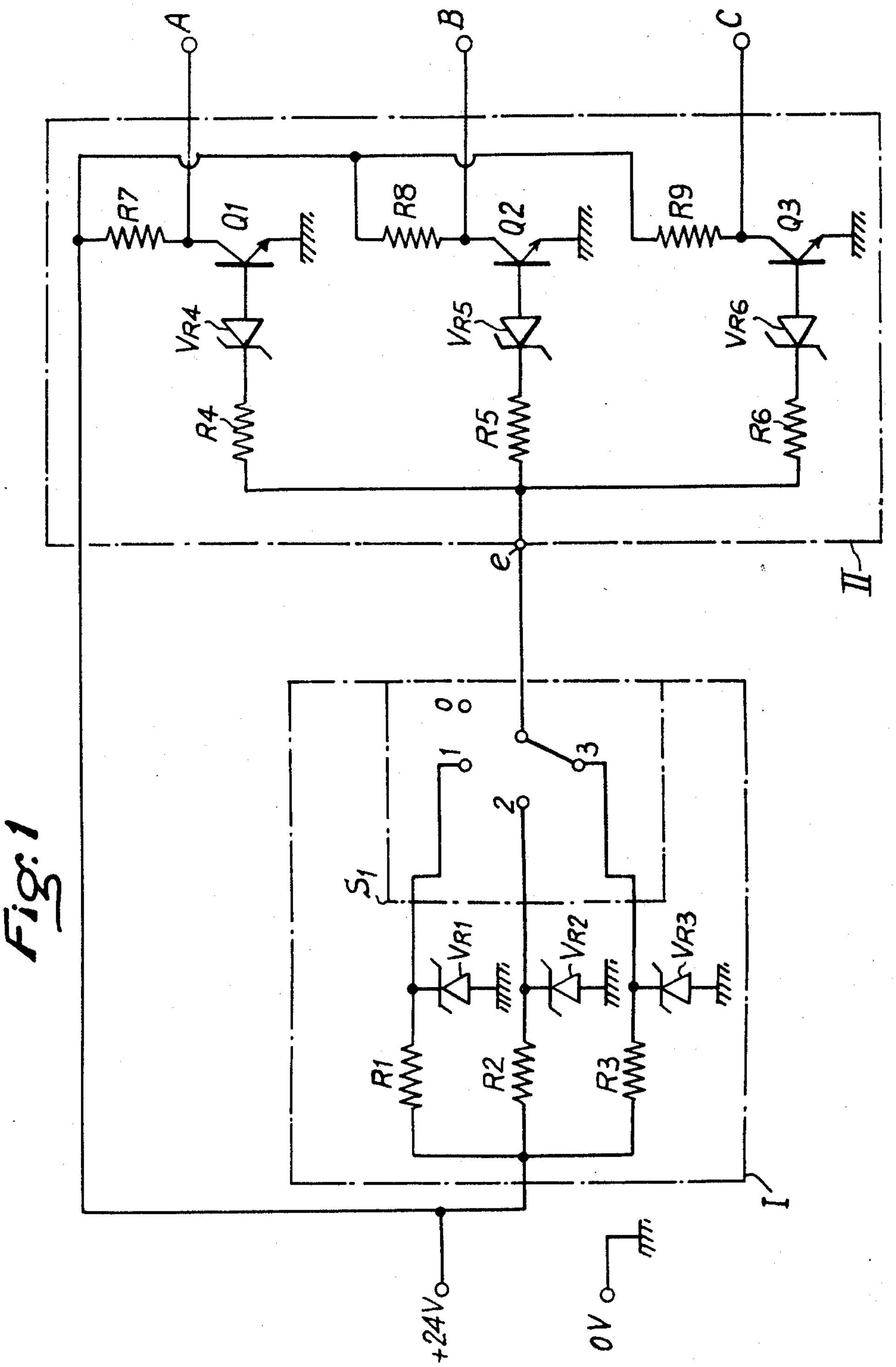
FIG. 1 is a wiring diagram illustrating the basic principle of the invention.

In FIG. 1, the reference roman numeral I designates a control unit and II designates a receiver unit. The component elements of the control unit are:

Zener diodes VR1, VR2, VR3;

Resistors R1, R2, R3 for limiting the current in said Zener diodes;

A rotary display-type selector-switch S1,

The component elements of the receiver unit are:

Zener diodes, VR4, VR5, VR6;

Resistors R4, R5, R6 for limiting the current in these Zener diodes;

Transistors Q1, Q2 and Q3 operating as switching devices;

load resistors R7, R8, R9 connected to the collectors of these transistors.

The Zener diodes are so selected that:

+24 V(d.c.) >UVR3 >UVR6 >UVR2 >UVR5>UVR1>UVR4, wherein UVR 1 to UVR 6 are the reference voltages of the corresponding Zener diodes.

The switch S1 may be set in any one of its four positions 0, 1, 2, 3 (this number of positions being given by way of example only) and the mode of operation of each one of these positions will now be explained in detail.

1st Case: Switch S1 is in position 0, and no voltage is present on the transmission channel at e; under these conditions the transistors Q1, Q2 and Q3, having their bases connected to the Zener diodes VR4, VR5 and VR6, respectively, are non-conducting and the output terminals A, B and C of the receiver unit, connected to the general supply network, are at the 24-Volt level.

2nd. Case: Switch S1 is in position 1 and an UVR1 voltage is available at e; thus, the diode VR4 is conducting and transistor Q1 having its collector connected to terminal A and its emitter grounded, is saturated thus bringing terminal A to ground potential.

Both diodes VR5 and VR6 are not conducting so that both transistors Q2 and Q3 remain blocked and terminals B and C remain at the 24-Volt level.

3rd. Case: Switch S1 is in position 2 and an UVR2 voltage appears at *e*: thus, both diodes VR4 and VR5 are conducting, thus saturating transistors Q1 and Q2, and bringing terminals A and B to ground potential.

Diode VR6 is not conducting, whereby transistor Q3 is blocked and terminal C is at the 24-Volt level.

4th. Case: Switch S1 is in position 3. the UVR3 Voltage available at *e* is sufficient for causing the three diodes VR4, VR5 and VR6 to be conducting. As a result, the three output terminals A, B and C are brought to the ground potential.

From the foregoing it is clear that to each switch position there corresponds a different state or condition of output terminals A, B and C, and that it is only necessary to decode these various states or conditions for performing the desired operation, for instance selecting anyone of the four firing rates obtainable with this arrangement.

It is obvious that the same line of thoughts could be followed if a greater number of channels were provided, subject however to the limitation due to the components tolerances, notably in the case of Zener diode, for a given supply voltage.

Figure 2:
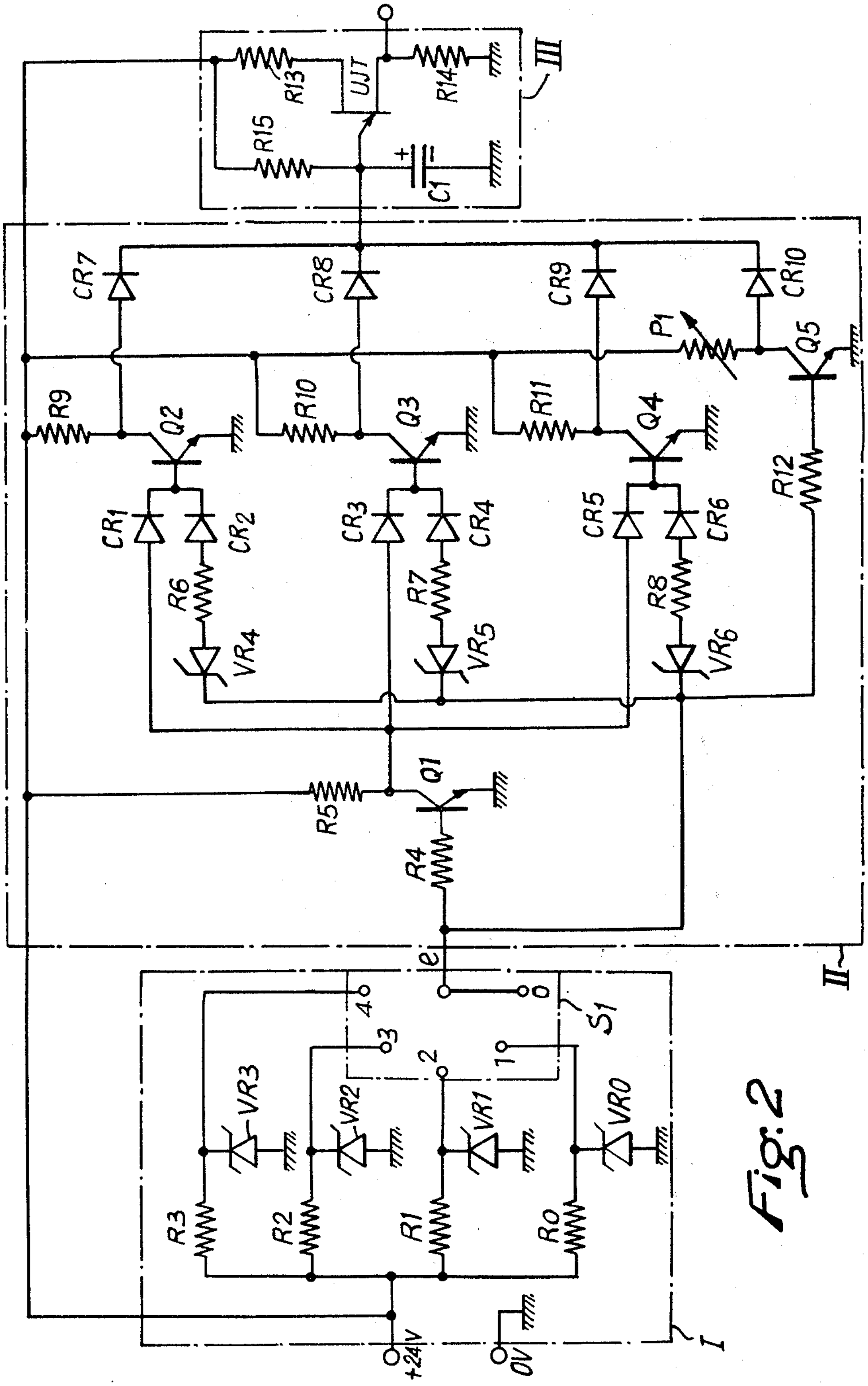
FIG. 2 is another wiring diagram illustrating a typical embodiment of this principle for controlling the firing rate on an aircraft.
Figure 3:
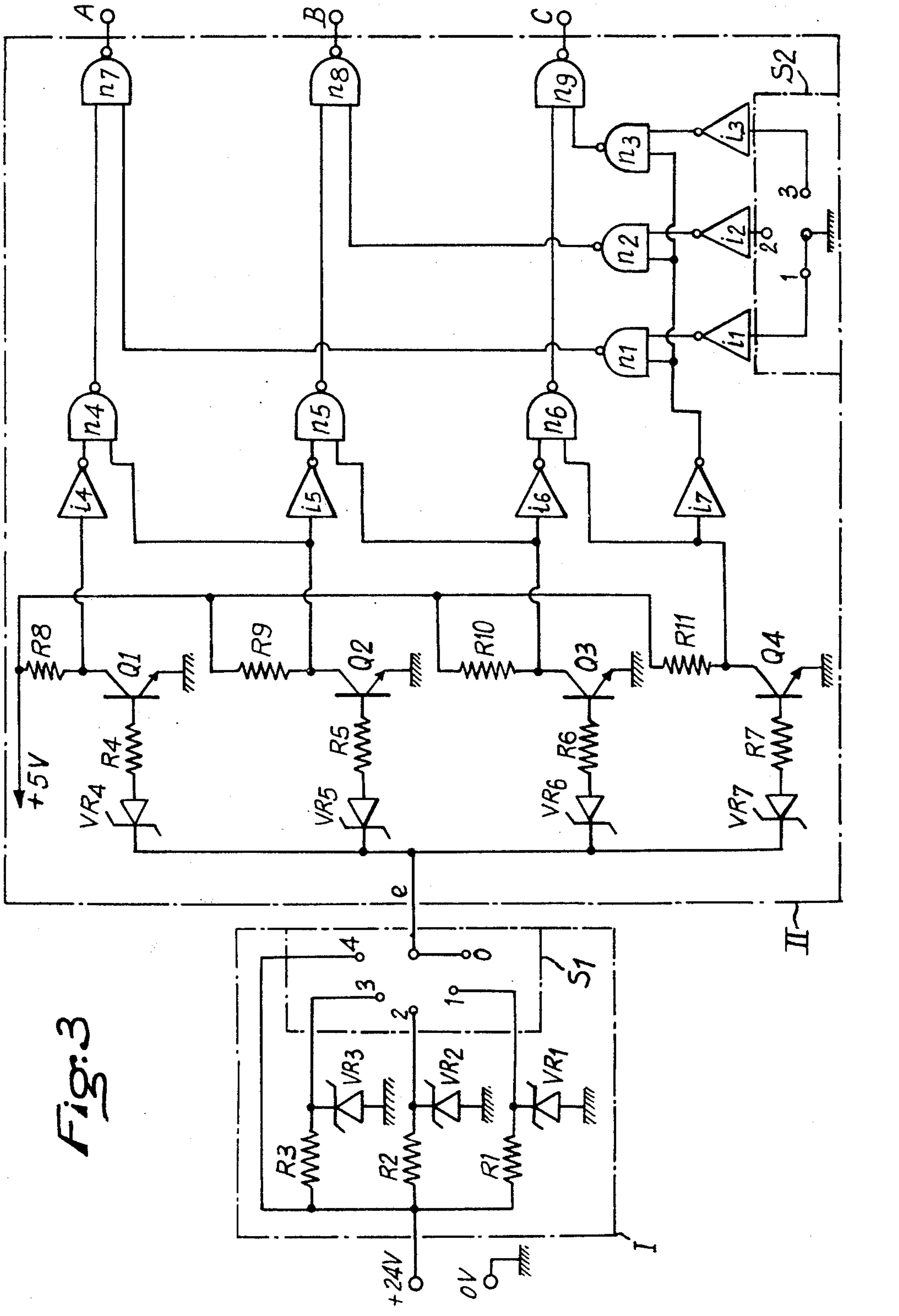
FIG. 3 is another wiring diagram illustrating another application of the same principle to the control of the volley-firing magnitude.

The diagrams of FIGS. 2 and 3 illustrate two different application of the same principle, providing on the one hand the remote control of the firing rate and on the other hand the remote control of the volley-firing magnitude.

FIG. 2 illustrates the specific application of this invention to the remote control of the firing rate.

Two possibilities are to be contemplated:

1. In case of voltage failure on the control line, the possibility should be reserved of adjusting the firing rate from the receiver unit.

2. If a suitable voltage is fed to the control line, it is required to inhibit the adjustment circuit located at the receiver unit, determine another firing rate as a function of the selected display.

The diagram of FIG. 2 illustrates:

at I, a control unit with a selector switch S1 for connecting one of the output circuits to the transmission line *e*;

at II, a receiver unit, at III, a pulse generator comprising a single-junction transistor UJT of which the operating frequency determines the firing rate.

In this Figure, the same reference numerals as in FIG. 1 designate the same elements or elements having a similar function.

1 st case. Switch S1 is in position 0. Under these conditions, line *e* is not energized and as a result:

transistor Q1 receiving at its base the voltage of point *e*, is blocked or non-conducting, and its collector biases the bases of transistors Q2, Q3 and Q4 which are thus conducting while their collectors are grounded, these collectors being connected to the anodes of diodes CR7, CR8 and CR9 having their cathodes connected to capacitor C1;

transistor Q5 also receiving at its base the voltage available at point *e*, is also blocked or non-conducting whereby its collector in series with a potentiometer P1 energizes the diode CR10 having its cathode connected to capacitor C1.

The charging reistance of capacitor C1 consists in this case of a parallel connection between resistor R15 and potentiometer P1 through which said capacitor is energized. Under these conditions, it is only necessary to adjust P1 for selecting the desired firing rate.

2nd case: Switch S1 is in position 1.

The voltage fed to *e* (UVRO) is so selected that it is sufficient for switching transistors Q1 and Q5, but not sufficient for causing the Zener diode VR4 and, all the more, diodes VR5 and VR6, to be conducting. Thus, transistors Q2, Q3 and Q4 are blocked. The charging resistance of capacitor C1 is therefore equal to the equivalent resistance resulting from the parallel connection of R9, R10, R11 and R15.

3rd case: Switch S1 is in position 2. A voltage is produced at *e*, so that:

transistors Q1 and Q5 are saturated, thus applying the ground potential to the anodes of the diodes CR1, CR3, CR5 and CR10, and blocking these diodes;

the Zener diode VR becomes conducting, so that transistor Q2 is blocked;

the Zener diodes VR5 and VR6 are blocked, thus making transistors Q3 and Q4 non-conducting.

The charging resistance of capacitor C1 is then equal to the equivalent resistance resulting from the parallel connection of R10, R11 and R15.

4th case: Switch S1 is in position 3.

The voltage appearing at *e* causes:

transistors Q1 and Q5 to be saturated, thus blocking diodes CR1, CR3, CR5 and CR10;

the Zener diodes VR4 and VR5 to be conducting, thus saturating transistors Q2 and Q3 having their bases connected to said Zener diodes via diodes CR2 and CR4.

The charging reistance of capacitor C1 is then equal to the equivalent resistance resulting from the parallel connection of R11 and R15.

5th case: Switch S1 is in position 4.

In this case, the Zener diodes VR4, VR5 and VR6 are conducting and saturate transistors Q2, Q3 and Q4, in addition to transistors Q1 and Q5. The charging resistance of capacitor C1 is thus equal to R15.

Under these conditions, it is clear that to each position of switch S1 there corresponds a specific charging resistance of capacitor C1, thus determining a frequency of operation of the single-junction transistor UJT and therefore a different firing rate.

Now reference will be made to FIG. 3 illustrating a typical application of this invention to the remote control of the volley-firing magnitude. The general problem arising from the adjustment of the volley-firing magnitude consists in permitting the opening of a given logic gate for each specific display value.

Three cases may arise:

i. The control line is connected directly to the 24-V d.c. power supply of the aircraft; the volley firing magnitude must be preset by displaying same on the receiver unit;

ii. No power is supplied to the control line: in this case, no limitation is imposed to the volley firing magnitude;

iii. The control line voltage is brought to an internediate potential between 0 and 24 Volt; the volley-firing magnitude is a function of the display achieved at the control unit.

The diagram of FIG. 3 comprises:

at I:*a* control unit incorporating a selector switch S1;

at II: a receiver unit comprising, in addition to the component elements already described hereinabove, a switch S2 permitting of displaying the desired control action at the receiver unit, and a decoder consisting of NO-AND gates and inverters.

1st case: Switch S1 in position 0.

No voltage is present at *e* and transistors Q1, Q2, Q3 and Q4 are blocked with their collectors (energized with an auxiliary 5 Volt voltage) connected to inverters i4 to i7. Under these conditions, the outputs of inventers i4 to i7 receiving the collector voltages of transistors Q1, Q2, Q3 and Q4, respectively, are in the logic state 0, thus imposing the logic state 1 to the outputs of AND-NO circuits N1 to N6 and therefore the logic state 0 to outputs A, B and C.

2nd case: Switch S1 is in position 1.

A voltage UVR1 is available at point *e* so that the Zener diode VR4 is energized and transistor Q1 is saturated. The Zener diodes VR5, VR6 and VR7 are not conducting and transistors Q2, Q3 and Q4 are blocked. The output of inverter N4 is then at the logic level 0 while the outputs of inverters N1, N2, N3, N5 and N6 are at the logic level 1.

Under these conditions, the output terminal A is at level 1 while terminals B and C are the logic level 0.

3rd case: Switch S1 is in position 2.

A voltage UVR2 is available at point *e*, thus energizing the Zener diodes VR4 and VR5 and saturating transistors Q1 and Q2. The Zener diodes VR6 and VR7 are not conducting and transistors Q3 and Q4 are blocked. The outputs of inverters N5 (of which the inputs receive the same voltage) is then at logic level O, while the outputs of inverters N1, N2, N3, N4 and N6 (of which only one input is energized) are at logic level 1.

Under these conditions, the output terminal B is at logic level 1 and terminals A and C are at level 0.

4th case: Switch S1 is in position 3.

It is obvious that in this case channel C is brought to logic level 1 while terminals A and B are at level 0.

5th case: Switch S1 is in position 4, under a +24 V power supply.

The voltage available at *e* is sufficient to cause all the Zener diodes to be conducting and saturate transistors Q1 and Q4. Under these conditions, the first inputs of gates N1, N2 and N3 are at logic level 1 and the outputs of gates N4, N5 and N6 are at logic level 1. it will be seen that under these conditions output terminals A, B and C are brought to potential 1 in positions 1, 2 and 3, respectively, of switch S2.

It will be clearly apparent to those skilled in the art that this invention can be carried out in actual practice in various ways without departing from the basic principles thereof as set forth in the appended claims.

What we claim is:

1. Device for the remote electrical transmission, via a single channel, of multiple orders from a single d.c. voltage, which comprises a control unit incorporating a selector switch connecting the transmission channel to anyone of a plurality of output circuits supplied with said single voltage but shunt-connected to respective Zener diodes having stepped reference voltages, and a receiver unit comprising transistors driven by circuit means supplied from said single channel through another set of Zener diodes, respectively, the reference voltage of these last-mentioned Zener diodes being stepped alternatively with respect to the voltages of the Zener diodes of said control unit, whereby said transistors will open or close different control circuits according to the position in which the control selector switch is set.

2. Control device as set forth in claim 1, in its specific application to the remote control of the firing rate of rockets or miscellaneous cartridges on an aircraft, said rate being determined by the time constant of a capacitor charged through a resistor, wherein the capacitor charging resistor consists, according to the momentary position of the control selector switch, either of a single resistor energized from the common supply, or of this resistor connected in parallel with other resistors adapted to be grounded selectively through transistors responsive to the transmission channel.

3. Device as set forth in claim 1, in its specific application to the remote control of the firing rate of rockets or miscellaneous cartridges on an aircraft, wherein the transistors are adapted control at said receiver unit either directly or through inverters the energization of electronic gates of which none of the outputs or only selected outputs is or are energized according to the momentary position of the control selector switch.

4. Device as set forth in claim 3, wherein the control selector switch has a position providing a direct connection between the transmission channel and the single source of direct current, said receiver unit comprising a display selector controlling the energization of the electronic gates for supplying current to anyone of the outputs, at will.

* * * * *